United States Patent [19]

Malatesta

[11] 4,292,221

[45] Sep. 29, 1981

[54] PREPARATION OF MODIFIED PETROLEUM RESINS

[75] Inventor: Alberto Malatesta, Brussels, Belgium

[73] Assignee: Exxon Research & Engineering Co., Florham Park, N.J.

[21] Appl. No.: 162,259

[22] Filed: Jun. 23, 1980

Related U.S. Application Data

[63] Continuation-in-part of Ser. No. 22,080, Mar. 19, 1979, Pat. No. 4,242,244.

[30] Foreign Application Priority Data

Jun. 22, 1979 [GB] United Kingdom ............... 21858/79

[51] Int. Cl.$^3$ ..................... C09D 3/733; C09D 11/10
[52] U.S. Cl. .................. 260/23.7 C; 106/27; 106/32; 260/DIG. 38; 526/308
[58] Field of Search ................. 260/23.7 C, DIG. 38; 526/308; 106/27, 32

[56] References Cited

U.S. PATENT DOCUMENTS

| | | | |
|---|---|---|---|
| 3,984,381 | 10/1976 | Tsuchiya et al. | 106/27 |
| 4,002,585 | 1/1977 | Oishi et al. | 260/25 |
| 4,028,291 | 6/1977 | Tsuchiya et al. | 260/23.7 C |
| 4,048,132 | 9/1977 | Tsuchiya et al. | 526/308 |
| 4,056,498 | 11/1977 | Laurito | 260/23.7 C |
| 4,087,483 | 5/1978 | Geerdes | 106/20 |

FOREIGN PATENT DOCUMENTS

| | | |
|---|---|---|
| 1369370 | 10/1974 | United Kingdom . |
| 1379037 | 1/1975 | United Kingdom . |
| 1437966 | 6/1976 | United Kingdom . |
| 1492701 | 11/1977 | United Kingdom . |

*Primary Examiner*—Ronald W. Griffin
*Attorney, Agent, or Firm*—Rebecca Yablonsky

[57] ABSTRACT

Carboxyl modified petroleum resins suitable as resins in inks for off-set printing are obtained by heating cyclopentadiene or a comparable monomer with 1 to 15 wt. % of a carboxylic acid which is not $\alpha$-$\beta$, unsaturated at from 270° C. to 290° under sufficient pressure to keep the mixture liquid.

4 Claims, No Drawings

PREPARATION OF MODIFIED PETROLEUM RESINS

This application is a continuation-in-part of Ser. No. 022,080, filed Mar. 19, 1979, now U.S. Pat. No. 4,242,244, issued Dec. 30, 1980.

The present invention relates to the preparation of a modified petroleum resin suitable for use as a printing ink resin especially for offset printing, to the resins so prepared and to printing inks containing the modified petroleum resin. Petroleum resins may be obtained by Friedel-Crafts or thermal polymerisation of feeds obtained from petroleum refining. It has been proposed that both types of resin may be used as raw materials for the production of printing ink resins. In all instances the resin is modified for use in the inks and we are concerned with resins obtained by thermal polymerisation since they generally have a higher degree of unsaturation.

It has been proposed and is common practice to use modified thermally polymerised petroleum resins as printing ink resins in rotogravure printing inks. For example U.K. Pat. No. 1369370 describes the preparation of such a modified resin and the properties that are required of a resin to be suitable for rotogravure inks. As mentioned in U.K. Pat. No. 1369370 the ink resins should be soluble in solvents such as toluene give solutions of viscosity from 100 to 500 centipoise. The requirements for offset printing inks are different in that offset inks use much higher boiling solvents and viscosities up to around 300 poise or higher are required.

The offset process is also very different from the rotogravure process and in the offset process certain areas of the printing plate are made receptive to the printing ink and certain parts receptive to water. In the printing process the plate is first coated with water so that water is retained only by those areas receptive to water and then coated with ink so that ink is retained only on those parts of the plate receptive to ink.

The printing plate therefore contains areas of ink adjacent areas of water and for good printing it is important that the boundary between the two areas is clearly defined and that neither water nor ink will migrate across the boundary since this will smudge the print. The modified petroleum resins that have hitherto been proposed as ink resins, for rotogravure printing are modified with polar compounds, frequently carboxylic acids and anhydrides, and will contain a significant amount of free carboxyl or anhydride groups some of which as in U.K. Pat. No. 1369370 may be neutralised with metal salts. In all these techniques however the presence of the free polar groups or the metal cation renders the resin and thus the printing ink hydrophilic and thus unsuitable for use in offset printing.

U.K. patent specification No. 1379037 and U.S. Pat. No. 4,087,483 describe resins which may be used as binders in offset printing ink. Both techniques require the esterification of carboxyl modified resins which is not only a further expensive operation but in some instances does not yield a resin satisfactory for use in off-set printing inks. The process of U.S. Pat. No. 4,087,483 which uses a mixture of acids and esterification with a polyol is complicated and expensive.

U.K. patent specifications Nos. 1379037, 1437966 and 1492701 and U.S. Pat. Nos. 3,984,381 and 4,002,585 and U.S. Pat. No. 4,087,483 also relate to producing ink resins for offset printing by carboxyl groups. In these techniques at least some of the acid which is reacted with the resin contains unsaturation, is an $\alpha,\beta$-unsaturated acid leading to an "ene" reaction and carboxyl groups in the treated resin are neutralised before the resin is used as an ink resin.

In our U.S. Pat. No. 4,242,244 we claim a carboxyl modified metal free petroleum resin obtained by thermal polymerisation of cyclopentadiene which has been reacted electrophilically with a carboxylic acid the modified resin having an acid number less than 20 and containing from 1 wt.% to 5 wt.% of oxygen and having a softening point of from 120° C. to 200° C. Also claimed are processes for the production of such a resin by heating the resin with a carboxylic acid under certain conditions and the use of the carboxyl modified resins in printing inks especially for off-set printing.

We have now found that modified resins of the type claimed in U.S. Pat. No. 4,242,244 may be readily obtained by the incorporation of a carboxylic acid during the thermal polymerisation of the cyclopentadiene and/or methyl cyclopentadiene and/or derivatives thereof. We find that this process not only produces resins with the properties required for use in off-set printing but is also quicker and more efficient than the process described in U.S. Pat. No. 4,242,244.

The present invention therefore provides a process for the production of a modified petroleum resin comprising heating a mixture of (A) cyclopentadiene and/or methyl cyclopentadiene and/or derivatives thereof and (B) from 1 to 15 wt.% of (A) of a carboxylic acid other than an $\alpha,\beta$-unsaturated carboxylic acid at from 270° C. to 290° C. under a sufficient pressure to maintain the mixture in the liquid phase.

We have found that the resins of the present invention are particularly useful for ink resins for off-set printing inks. The carboxyl modification of the resin insures good retention of the pigment whilst the low carboxyl number and absence of metallic cations renders the resin hydrophobic. The resins are also soluble in the petroleum distillate solvents frequently used in off-set printing inks to give solutions of the desired viscosity.

Component (A) of the mixture contains dicyclopentadiene, methyldicyclopentadiene, cyclopentadiene, methycyclopentadienes, cyclopentadienemethylcyclopentadiene codimers and generally has a concentration of from 10 to 90 wt.%, preferably 40 to 80 wt.% of unsaturated components of which preferably from 50 to 95 wt.% are cyclopentadiene derivatives. Other hydrocarbons such as the unsaturated polymerisable aromatics, styrene, vinyltoluene, indene and methylindene may be added to the feed to the thermal polymerisation. The presence of the aromatic component in the mixture results in a resin of improved wetting power when used in the ink and we prefer to include from 1 to 50 wt.% preferably 10 to 30 wt.% of the unsaturated aromatic based on the total weight of the feed.

The pressure during the thermal polymerisation should be sufficient to maintain the mixture liquid. We generally find that pressures in the range 10 to 20 Kg/Sq cm are sufficient. When the resin is to be used as an ink resin it preferably has a number average molecular weight, as measured by Vapour Phase Osmometry of from 900 to 1200. If the molecular weight is lower it is difficult to achieve the viscosity and tack required for off-set inks. For this reason we prefer to heat the mixture for at least 2½ hours.

Any carboxylic acid other than an α,β unsaturated acid may be used in the process of this invention. It may be saturated or unsaturated. The quantity of acid used will depend upon the molecular weight of the acid and the required carboxyl or ester content of the resin. Examples of suitable acids include acrylic acid, acetic acid the higher acids such as neo-decanoic acid and tall oil acid being preferred for ink resins.

We have found that the presence of the carboxylic acid increases the rate of thermal polymerisation of the cyclopentadiene and/or methylcyclopentadiene which is an added advantage of the process of this invention. In addition we find that acceptable resins may be obtained without the need to cool and heat soak the resins as in the processes of our U.S. Pat. No. 4,242,244. We have found that the only step necessary after thermal polymerisation is to strip to remove residual monomers, any low molecular weight oligomers that may have been formed and any process solvent that has been used. Without such a stripping the softening point of the resin tends to be too low for use in off-set printing.

We have also found that it is not essential that the carboxylic acid be present when heating is started. For example some carboxylic acid may be present at the start and the remainder added at any time during the heating or heating may be started in the absence of the carboxylic acid which is added later during the heating cycle.

We believe that two reactions take place when the mixture is heated. The Diels Alder reaction for the polymerisation of the cyclopentadiene and also the electrophilic reaction of the carboxylic acid as described in our U.S. Pat. No. 4,242,244 this providing a carboxyl modified resin as follows:

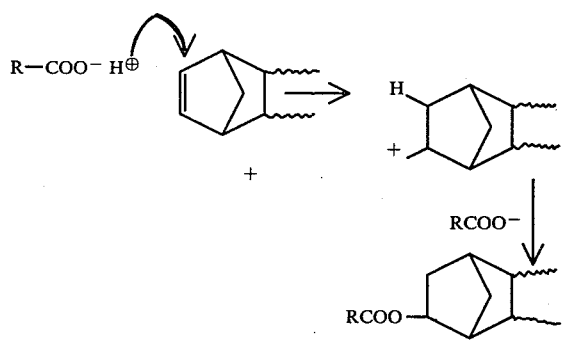

thus resulting in ester group formation.

The electrophilic carboxyl modification may be achieved with unsaturated or saturated mono- or poly-carboxylic acids but where an ethylenically unsaturated acid is used the unsaturation should not be α,β to an activating oxygen function, such as a carboxyl or anhydride group, since these tend to undergo ene addition reactions with the bicycloheptene double bonds rather than the protonation reaction to produce the compounds of this invention. Thus maleic or fumaric acids and anhydrides are not suitable. Use of unsaturated acids however allows control of the amount of unsaturation present in the resin which is especially useful when the resins are used in what are known as quickset inks where the ink is dried very rapidly after printing by air oxidation of the unsaturation in the resin generally using a drying catalyst such as cobalt naphthenate. Mixtures of saturated and unsaturated acids may be used to control the drying and also to give resins of the desired viscosity and softening point. Out preferred acids are the synthetic saturated or unsaturated fatty acids such as the $C_7$ and higher neo acids and myristic, palmitic, stearic, oleic, linoleic and linolenic acids and the naturally occuring acids such as tall oil acids, linseed oil acids, fish oil acids and sunflower oil acids.

We find that the resins obtained by our process are particularly useful as resins for off-set printing inks and the inks using our resins can be prepared by any customary method.

For example, an ink vehicle of the following formulation is first prepared.

Composition of the ink vehicle.

| Resin | 5 to 80, preferably 10 to 50 |
|---|---|
| Drying oil | 0 to 100, preferably 10 to 50 |
| Assistant | 0 to 10, preferably 1 to 5 |
| Solvent | Balance, preferably 70 to 150 |
| Total | (parts by weight) |
| 100 parts by weight | |

These ingredients were dissolved at room temperature or at an elevated temperature (200° to 300° C.). The resin may be the resin of this invention alone or in combination with other natural or synthetic resins. The drying oil is generally linseed oil, tung oil or dehydrated castor oil. The assistant may, for example, be added to improve processability (by adjusting viscosity, elasticity or plasticity of an ink), dryability (to improve the drying of oily inks or to prevent skinning or thickening) or finish (for example to prevent blocking, to improve scratch resistance or to adjust colour density). Examples of suitable assistants are aluminum stearate and organic bentonite. The solvent is typically a hydrocarbon petroleum distillate containing $C_{12}$–$C_{16}$ hydrocarbons boiling in the range 210°–330°.

The ink vehicle so prepared is mixed with a pigment in a mixer, and then, the pre-mix may be further kneaded using such a device as roll mill, sand mill, attriter or colloid mill. Any of the conventional pigments may be used. An assistant and a solvent are added to the kneaded mixture and they are mixed in a mixer or roll mill. Typical recipes for ink preparation are as follows:

| Ink vehicle | 40 to 80, preferably 50 to 60 |
|---|---|
| Pigment | 10 to 60, preferably 20 to 40 |
| Assistant | 0 to 15, preferably 1 to 10 |
| Solvent | Balance |
| Total | |
| 100 parts by weight. | |

Examples of the assistant are processability adjuster (e.g. high viscosity varnish, gel varnish or diluted varnish), dryability adjuster (e.g. a dryer or inhibitor) or usability adjuster (e.g. scratch-proof waxes).

Thus according to another aspect of this invention, there is provided a printing ink composition comprising (a) 5 to 30% by weight of a resin prepared according to the invention, (b) 5 to 30% by weight of a drying oil, (c) 20 to 40% by weight of a pigment, (d) 0 to 10% by weight of an assistant and (e) a solvent being the balance, the proportions of components (a), (b), (c), (d) and (e) being based on the total weight of the composition.

The present invention is illustrated but in no way limited by reference to the following examples.

EXAMPLE 1

1500 grams of dicyclopentadiene and 100 grams of tall oil fatty acid are introduced into a pressure reactor in which a pressure of 10 Kg/sq cm is maintained. The mixture is heated at 280° C. for 160 minutes then cooled to 150° C. and discharged into a steam stripping vessel where it is stripped with superheated steam at 250° C.

1285 grams of a resin of acid number 2.8 were obtained, 291 grams of oligomers of acid number 6.4 and 34 grams of solvent were stripped off. The resin yield was therefore 80.3%.

The resin obtained had a iodine number of 167 a number average molecular weight (VPO) of 1100, a Gardner Colour (50/50 wt. in toluene) of 13- and a softening point (capillary) of 145° C. The resin was soluble (to give a 10% solution) in the oils used for offset printing and printing of excellent quality was obtained with a quickset ink containing the resin.

EXAMPLE 2

2000 grams of a 79.5% solution of dicyclopentadiene in toluene and 104 grams of tall oil fatty acid are heated whilst stirring in a pressure reactor at 16 Kg/sq cm pressure at 280° C. for 300 minutes. The reactor is then cooled, the pressure vented and the material discharged into a steam stripping vessel. The solvent is removed at 120° C. to 150° C. and superheated steam at 250° C. introduced to remove unreacted monomers and low molecular weight oligomers. 1389 grams of resin of acid number 2.3, 201 grams of oligomers of acid number 2.5 and 514 grams of solvent were obtained. The resin yield was 82% and the resin had an iodine number of 157, a Gardner colour (50/50 wt. in toluene) of 15 and a capillary softening point of 142° C.

The resin was soluble in the oils generally used in off-set printing.

EXAMPLE 3

2000 grams of a 79.5 wt.% solution of dicyclopentadiene in toluene was heated while stirring in a pressure vessel under 19 Kg/sq cm pressure at 280° C. for 160 minutes. 104 grams of tall oil fatty acid are then introduced under the same conditions and heating continued for a further 120 minutes.

The product is then stripped as an Example 2 to yield 1375 grams of a resin of acid number 2.2, iodine number 163, Gardner colour (50/50 wt. in toluene) 14 and a capillary softening point of 153° C. 377 grams of oligomers were stripped off having an acid number of 26.0.

The resin was soluble in the oils generally used in off-set printing.

What we claim is:

1. A process for the production of a modified petroleum resin comprising heating a mixture of (A) cyclopentadiene and/or methyl cyclopentadiene and/or the dimers or codimers thereof and (B) from 1 to 15 wt.% of (A) of a saturated or ethylenically unsaturated $C_7$ or higher fatty acid at a temperature in the range of 270° C. to 290° C. under a sufficient pressure to maintain the mixture in the liquid phase to obtain a resin with an acid number below 20.

2. A modified petroleum resin whenever obtained by a process according to claim 1.

3. An ink for use in offset printing containing as binder a modified petroleum resin according to claim 2.

4. A printing ink composition comprising (a) 5 to 30% by weight of a modified petroleum resin as claimed in claim 2 and (b) 5 to 30% by weight of a drying oil (c) 20 to 40% by weight of a pigment, (d) 0 to 10% by weight of an assistant and (e) a solvent being the balance, the components (a), (b), (c), (d) and (e) being based on the total weight of the composition.

* * * * *